(12) United States Patent
Hilleary

(10) Patent No.: US 6,502,030 B2
(45) Date of Patent: Dec. 31, 2002

(54) WEB BASED VEHICLE TRACKING AND USER ON-BOARD STATUS SYSTEM

(75) Inventor: Thomas N. Hilleary, Chesterfield, MO (US)

(73) Assignee: LaBarge, Inc., Clayton, MO (US)

( * ) Notice: Subject to any disclaimer, the term of this patent is extended or adjusted under 35 U.S.C. 154(b) by 0 days.

(21) Appl. No.: 09/769,537

(22) Filed: Jan. 25, 2001

(65) Prior Publication Data

US 2002/0099501 A1 Jul. 25, 2002

(51) Int. Cl.$^7$ ............................ G08G 1/123; G01S 5/00
(52) U.S. Cl. ..................... 701/207; 701/213; 340/992; 342/357.09
(58) Field of Search ................................. 701/207, 117, 701/213; 340/989, 992; 342/357.07, 357.09, 357.1

(56) References Cited

U.S. PATENT DOCUMENTS

| | | | |
|---|---|---|---|
| 6,006,159 A | * 12/1999 | Schmier et al. | 340/988 |
| 6,240,362 B1 | * 5/2001 | Gaspard, II | 340/991 |
| 6,330,499 B1 | 12/2001 | Chou et al. | |
| 6,331,825 B1 | * 12/2001 | Ladner et al. | 340/988 |
| 6,339,397 B1 | * 1/2002 | Baker | 342/357.07 |
| 6,347,739 B1 | * 2/2002 | Tamam | 235/384 |

* cited by examiner

Primary Examiner—Michael J. Zanelli
(74) Attorney, Agent, or Firm—Armstrong Teasdale LLP

(57) ABSTRACT

A web based vehicle tracking system includes a passenger identification device that registers when a passenger boards and disembarks the vehicle. The web based vehicle tracking system utilizes a vehicle information system, that includes the passenger identification device, and a base station network administrator to monitor the travel of a vehicle and the on-board status of a passenger. Using, a user communications interface, a user accesses the Internet to query passenger on-board status information.

16 Claims, 4 Drawing Sheets

WEB BASED VEHICLE TRACKING AND USER ON-BOARD STATUS SYSTEM

BACKGROUND OF THE INVENTION

This invention relates generally to a vehicle travel information system, and more particularly to a web-based vehicle travel information system.

In situations where vehicles are utilized to transport people, product, or packages, a prevalent problem is the unpredictability of the arrival of the vehicle at a specific location. Factors contribute to the timeliness of vehicular travel such as inclement weather, traffic flow, vehicle maintenance and other unexpected delays and can effect the schedule of the vehicle. For example, school children who ride buses to school often have to wait at their bus stops for extended lengths of time because school buses arrive at particular bus stops at substantially different times from one day to the next. The arrival times of school buses can be significantly affected by many factors such as maintenance problems, rush hour traffic, and congested urban/suburban conditions. As a result, school children are forced to wait at their bus stops for long periods of time, often times in adverse weather conditions, on unlit street corners, or near busy or secluded streets.

It is known to utilize a system that employs the use of a transmitter on the vehicle and a receiver in the home or office of the user such that when the vehicle comes within a certain range of the receiver, the receiver signals the user that the vehicle is approaching. Additionally it is known to utilize a system that employs a satellite tracking system, such as a global positioning system (GPS), to track the vehicle, a transmitter located on the vehicle, and a base station capable of receiving transmissions and sending a message to the user's locations notifying the user of the impending arrival of the vehicle. While such systems work satisfactorily under certain circumstances, they are limited in the type of information and flexibility they provide the user.

BRIEF SUMMARY OF THE INVENTION

In an exemplary embodiment, the web based vehicle tracking system includes a passenger identification device that registers when a passenger boards and disembarks a vehicle. The web based vehicle tracking system includes a vehicle information system that is coupled to the vehicle and includes the passenger identification device. The web based vehicle tracking system also includes a base station network administrator, located at a remote site, which monitors the on-board status of a passenger, and communicates with a user communications interface. Using, the user communications interface, located at a user premise, a user accesses the Internet to query passenger on-board status information.

During operation, a vehicle information system processor receives vehicle location data and transmits such data to a base station computer. The base station computer utilizes the vehicle location data and mapping software to generate a current graphical representation of the vehicle location. A user utilizes the user communication interface to access the Internet and view the graphical representation. As a passenger boards the vehicle a passenger boarding identification is input to the passenger identification device. The boarding identification is communicated to the vehicle information system processor that transmits the boarding identification to a base station computer. The base station computer accesses a database and retrieves passenger information that corresponds to the boarding identification. Similarly, when a passenger disembarks, the base station computer receives a disembarking identification and retrieves the corresponding information. The base station computer monitors the on-board status of a passenger and communicates the status to a user upon request from a user, via the user communications interface.

DETAILED DESCRIPTION OF THE INVENTION

The features and principles of the present invention will now be described relative to an exemplary embodiment thereof. It will be apparent to those skilled in the art that numerous variations o r modifications may be made to the exemplary embodiment without departing from the spirit and scope of the present invention. The system and method are not limited to the specific embodiments described herein. Components of each system and method can be practiced independent and separate from other components and methods. Each system and method also can be used in combination with other components and methods .

Figure 1:
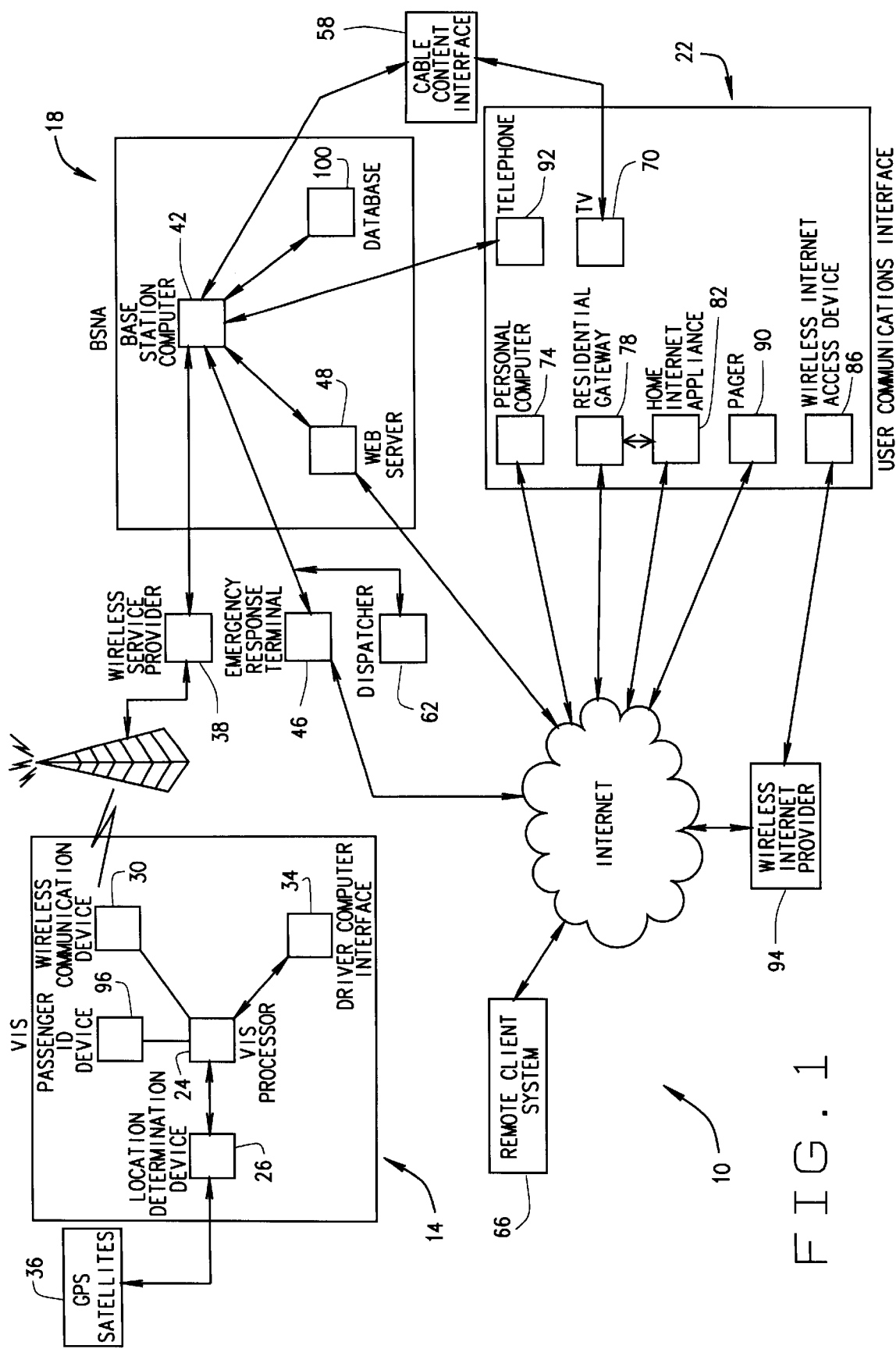
FIG. 1 is a block diagram of a vehicle travel information system in accordance with an exemplary embodiment of the present invention.

FIG. 1 depicts a vehicle travel information system I of the present invention. Vehicle travel information system 10 comprises at least one vehicle information system (VIS) 14 coupled to at least one vehicle (not shown), a base station network administrator (BSNA) 18 located at a remote site, and at least one user communications interface 22.
Vehicle Information System VIS 14 includes a VIS processor 24, a location determination device 26, such as a global positioning system (GPS) receiver, a wireless communications device 30, a VIS, and a driver computer interface 34. In one embodiment, location determination device 26 receives vehicle position data from a GPS satellite network 36, including at least one satellite, and determines the vehicle's location. For example, PS satellite network 36, having 3 satellites, transmits position data to location determination device 26 which utilizes the position data to resolve a vehicle location. Although the exemplary embodiment utilizes GPS to monitor vehicle location, other suitable position tracking systems may be used.

VIS processor 24 controls the overall operation of VIS 14. In the exemplary embodiment, VIS processor 24 interacts with VIS wireless communication device 30, location determination device 26, and driver computer interface 34. For example, VIS processor 24 interacts with VIS wireless communication device 30 to communicate with BSNA 18 via a wireless service provider 38. Information from VIS processor 24 is transmitted wirelessly over a network to a wireless service provider 30, comprising a wireless switch (not shown), which translates information and puts it on a line device, such as a phone line, which then connects to BSNA 18. VIS processor 24 also interacts with driver computer interface 34 to provide or receive information to or from the driver. Driver computer interface 34 receives and displays information inputs from the vehicle driver, VIS processor 24 and BSNA 18.

In one embodiment, VIS processor 24 receives vehicle location data from location determination device 26, monitors the vehicle's location and transmits the vehicle location data to BSNA 18 upon occurrence of certain prompting events. Upon the occurrence of certain 'Prompts', VIS processor 24 transmits updated vehicle location data to BSNA 18, via VIS wireless communication device 30 and wireless service provider 38. The Prompts include starting the vehicle's engine, putting the vehicle in drive, opening a door, an absence of vehicle movement for preset time period, the vehicle traveling a preset number of miles, a preset time elapsing, upon request from BSNA 18, the vehicle exceeding a preset speed, the engine functioning improperly, at predetermined waypoints, or the driver depressing an 'Assist' button 40. The occurrence of any other event, in addition to those listed above, could be utilized as a Prompt. BSNA 18 monitors the vehicle location data and compiles vehicle travel information.

Figure 5:
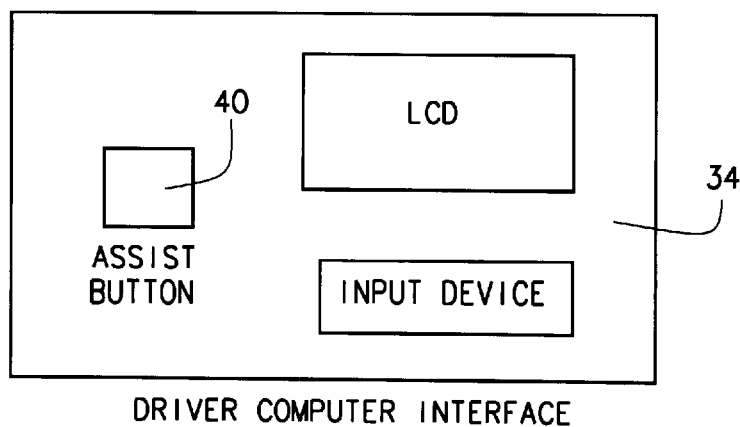
FIG. 5 is a block diagram of a driver computer interface for the vehicle travel information system shown in FIG. 1.

As shown in FIG. 5, driver computer interface 34 includes an 'Assist' button 40. Assist button 40 sends an emergency signal to base station computer 42 via VIS wireless communication device 30 and wireless service provider 38. If the vehicle becomes disabled or indefinitely delayed the vehicle driver depresses Assist button 40, which causes VIS processor 24 to send an emergency signal and the current vehicle location to base station computer 42. Upon receiving the emergency signal, base station computer 42 generates an emergency message to an emergency response terminal 46 and user communications interface 22. The emergency message to emergency response terminal 46 notifies an emergency response dispatcher that the vehicle needs immediate assistance and gives the dispatcher the vehicle location. In one embodiment, the emergency message to the user notifies the user that the vehicle has incurred a problem, will be delayed, and the approximate length of the delay.

In the exemplary embodiment Assist button 40 notifies the emergency response terminal 46 that the vehicle has incurred mechanical problems such as engine problems or a flat tire. In an alternative embodiment, Assist button 40 is used to send notification of other emergency situations such as the vehicle being involved in an accident, a medical problem with a person in the vehicle, a disturbance on the vehicle, etc. A further alternative embodiment includes more than one Assist button. A first 'Assist' button 40 signals mechanical or other problems and requests the emergency response dispatcher to send an emergency assistance crew to evaluate and make repairs, and dispatch a replacement vehicle. A second button informs the dispatcher to send an emergency medical team (EMT), or the police. The aforementioned functions and applications of Assist button 40 are exemplary only. Other functions are possible and can be utilized in connection with practicing the system and method described herein.

Base Station Network Administrator

In an exemplary embodiment, BSNA 18 includes, base station computer 42, and a web server 48. BSNA 18 communicates with VIS 14, stores user defined vehicle travel information message triggers, analyzes vehicle travel information and mapping data, downloads a current graphical representation of a vehicle's location, and generates messages to user communications interface 22. Wireless service provider 38 communicates with VIS wireless communication device 30, and is electronically interfaced with base station computer 42. Vehicle location data, vehicle driver inputs and other information is transmitted by VIS 14 to BSNA 18, allowing base station computer 42 to monitor the vehicle's travel, adherence to time schedule, vehicle operational status, and other pertinent information. Base station computer 42 also contains user specified vehicle travel information message triggers defining when, where, and how the user desires to be notified of vehicle travel information. Base station computer 42 compares the vehicle travel information, and other data transmitted by VIS 14, to the vehicle travel information message triggers. When a match occurs base station computer 42 sends a vehicle travel information message to user communications interface 22 informing the user the vehicle has reached a particular location or is a specified number of minutes from a particular location.

Base station computer 42 also generates a current graphical representation of a vehicle location on a web site that can be accessed by user communications interface 22 via the Internet. Base station computer 42 interprets the vehicle location data received from VIS 14 then employs a mapping program to create a current vehicle location mapping display that can be viewed on user communications interface 22. The mapping program has appropriate information such as pertinent street locations, vehicle speed limits, and traffic flow patterns. In an exemplary embodiment, base station computer 42 communicates with user communications interface 22, via the Internet. Using the Internet, the user views the web site utilizing user communications interface 22.

In addition, base station computer 42 transmits information to VIS 14 instructing VIS processor 24 to perform certain operations or display a message to the vehicle driver on driver computer interface 34. Base station computer 42 also interfaces with devices such as, but not limited to, a cable content interface 58, a dispatcher 62, and/or a remote client system 66. Cable content interface 58 communicates with a user television 70 via a cable television service provider. Therefore, a user sets user television 70 to a specific channel and views a current graphical representation of one or more vehicle locations. Dispatcher 62 tracks vehicle location and a user calls base station computer 42, using a telephone interface, to obtain current information about the vehicle location. Base station computer 42 also communicates with a remote client system 66 via web server 48 and the Internet.

In one embodiment, remote client system 66 is a computer including a web browser. Remote client system 66 is interconnected to the Internet through at least one interface such as a local area network (LAN), a wide area network (WAN), dial-in-connections, cable modems, and phone lines. Remote client system 66 is any device capable of interconnecting to the Internet including a web based phone or other web based connectable equipment. By communicating with web server 48, via the Internet, remote client system 66 retrieves vehicle travel information from base station computer 42 and downloads the information to a web site allowing the user to utilize an alternate Internet web site or other Internet accessible means to view a current graphical representation of the vehicle location.

User Communications Interface

User communications interface 22 includes at least one of, but is not limited to, a personal computer 74, a residential gateway 78, a home Internet appliance 82, a wireless Internet access device 86, a pager 90, a telephone interface 92, and user television 70. By configuring personal computer 74 to access the Internet, the user calls up a web page and views a current graphical display of the vehicle location, inputs user defined vehicle travel information message triggers, and receives vehicle travel information messages.

Home Internet appliance 82 is an appliance that lacks the processing capabilities of a personal computer but allows the user access to the Internet, view a web site, and input information. Residential gateway 78 is a device that connects an external network, or the Internet, with an internal home network. The internal home network includes such devices as a personal computer, a television, and a home Internet appliance. Using residential gateway 78 as a user communications interface 22 the user benefits from the features of a home network system while utilizing the Internet to access a web page. Thus, personal computer 74, residential gateway 78 and home Internet appliance 82 provide a medium by which the user views a current graphical display of the vehicle location, receives vehicle travel information messages, receives other vehicle information messages, and interfaces with BSNA 18 to request information and preset vehicle travel information message triggers.

Wireless Internet access device 86 includes at least one of a hand held computer and a personal data assistant (PDA). These devices are equipped with wireless modems that access the Internet via a third party wireless Internet provider 94. In one embodiment, wireless Internet access device 86 is initialized as user communications interface 22 to communicate with base station computer 42 and utilize the features of system 10. When user communications interface 22 is a pager 90, base station computer 42 communicates messages to the user utilizing a telephone interface, standard public switched telephone network (PSTN), and a commercial paging system, or an Internet accessible paging application.

When the user communicates with base station computer 42 via a PSTN, using telephone interface 92 as user communications interface 22, telephone interface 92 rings to provide the user notification regarding the location of a vehicle. Additionally, telephone interface 92 can be utilized to program message triggers. Implementing an interactive voice response system the user presets the vehicle travel information message triggers using telephone interface 92 that includes a touch tone phone.

Vehicle travel information message triggers are preset by the user utilizing user communications interface 22 to communicate with base station computer 42. The vehicle travel information message triggers to be preset include when a message is to be generated, the content of the message, and whether to receive a visual message, and/or an audible message. In an exemplary embodiment the content and presentation of messages displayed on user communication interface 22 are not limited to showing the vehicle location on a map, or displaying messages informing the user of the impending arrival of the vehicle. In addition, base station computer 42 responds to user requests or preset triggers and generates messages informing the user that the vehicle is passing user selected mileposts, the vehicle is approximately within a user selected number of miles from a predetermined location, the vehicle rate of progress is varying from normal progress patterns due to reasons such as weather or traffic delays, the vehicle's subsequent destination, when the vehicle reached a specific location, when the vehicle departed from a specific location, and as described above, when the vehicle encounters an emergency.

In one embodiment user communications interface 22 includes audio and video display capabilities. The user selects mileposts along a vehicle route so that when the vehicle passes a milepost base station computer 42 generates an audio, video or text message informing the user of the vehicle's progress along that route. In an alternate embodiment, the user receives a message when the vehicle is within an approximate number of miles from a predetermined location, by interfacing with the base station computer 42, via user communications interface 22, and configuring the messaging component of system 10 to generate such a message. In a further alternate embodiment the user presets vehicle travel information message triggers so that if the progress of the vehicle along a route is delayed due to heavy traffic, inclement weather, or other causes, base station computer 42 informs the user by sending a message stating that there is a delay, and the approximate length of the delay. In another alternate embodiment base station computer 42 is configured to generate a message to user communications interface 22 informing the user of the vehicle's subsequent destination. In a still further embodiment, the user configures base station computer 42 to generate a message informing the user the vehicle has reached a predetermined destination, and to generate another message informing the user when the vehicle has left that location. In yet another alternate embodiment, messages show vehicle driver information, vehicle identification information, vehicle operation information, time countdown, mileage countdown, cargo information, whether the vehicle is running behind or ahead of schedule, etc. The aforementioned messages are exemplary only. The system and method described herein is capable of generating messages in many other formats with any content desired.

Messaging

In an exemplary embodiment, the messaging program associated with system 10 is configured such that user communications interface 22 includes either personal computer 74, residential gateway 78, home Internet appliance 82, wireless Internet access device 86, or user television 70. Therefore, user communications interface 22 visually displays information and communicates a vehicle travel information message to the user in the form of an E-mail message, an animated video message, or other graphically rendered routines. In an alternate embodiment, the vehicle travel information message is communicated to the user in the form of an audio message including a distinctive audio sound, or a computer generated language message so that the recipient can be away from user communications interface 22 and receive the message.

Party or Package Tracking

Additionally, system 10 allows a user to track a party or package to verify that the party or package was picked up and/or delivered to the proper location. For example, in a school bus context, such a feature would generate messages informing the user when the child boarded the school bus, when the bus reached the objective location, when the child disembarked the bus, and would allow the user to verify that the child was still on the bus as the bus progressed along a scheduled route.

In an exemplary embodiment relating to tracking a passenger of a vehicle, VIS 14 includes a passenger identification device 96, and base station network administrator 18 includes a database 100. Passenger identification device 96 receives either a boarding identification input or disembarking identification input from a passenger and/or a vehicle driver, and database 100 contains passenger information. The boarding identification and the disembarking identification include a passenger identification that uniquely identifies individual passengers. The passenger information stored in database 100 includes information about the passenger such as the passenger identification, passenger's address, phone number, desired boarding location, desired disembarking location, and desired method of receiving information messages. Once passenger identification device 96 receives a boarding identification input or disembarking input, the input is communicated to VIS processor 24, and then transmitted to base station computer 42. Base station computer 42 interprets the passenger identification input, accesses database 100, retrieves the passenger information corresponding to the passenger identification, generates notification messages to user communications interface 22, and monitors the on-board status of the passenger.

When a passenger boards the vehicle either the passenger or the vehicle driver inputs a boarding identification into passenger identification device 96. As stated above, the input is transmitted to, and interpreted by, base station computer 42. After retrieving the corresponding passenger information from database 100, base station computer 42 notes the passenger has boarded the vehicle and generates a message to the user notifying the user the passenger has boarded the vehicle, and giving the location of boarding. Upon disembarking the vehicle the passenger or driver inputs a disembarking identification into passenger identification device 96, and again the input is transmitted to base station computer 42. Base station computer 42 then retrieves the corresponding passenger information from database 100, notes that the passenger has disembarked, and generates a second message to the user notifying the user that the passenger has disembarked and giving the location the passenger disembarked.

A user wishing to check the on-board status of a passenger utilizes user communication interface 22 to communicate with base station computer 42. If a boarding identification was not received then base station computer 42 responds to the user inquiry that the passenger did not board. If base station computer 42 has received a boarding identification but not a disembarking identification, then the user is notified that the passenger remains on-board the vehicle, and is given the location the passenger boarded. If base station computer 42 has received both a boarding identification and a disembarking identification, a message is sent to the user showing the passenger boarded, the boarding location, the passenger disembarked, and the disembarking location. An alternate embodiment includes security features such that a passenger is only permitted to board at a specific location, and only permitted to disembark at a specific location. When such security features are enabled, a message is displayed on driver computer interface 34 to inform the driver of the restrictions.

In an alternative embodiment system 10 tracks packages, products, or anything transported by a vehicle. The aforementioned functions and applications of the party or package tracking feature are exemplary only. Other functions and applications are possible and can be utilized in connection with practicing the system and method herein.

General Operation

Figure 2:
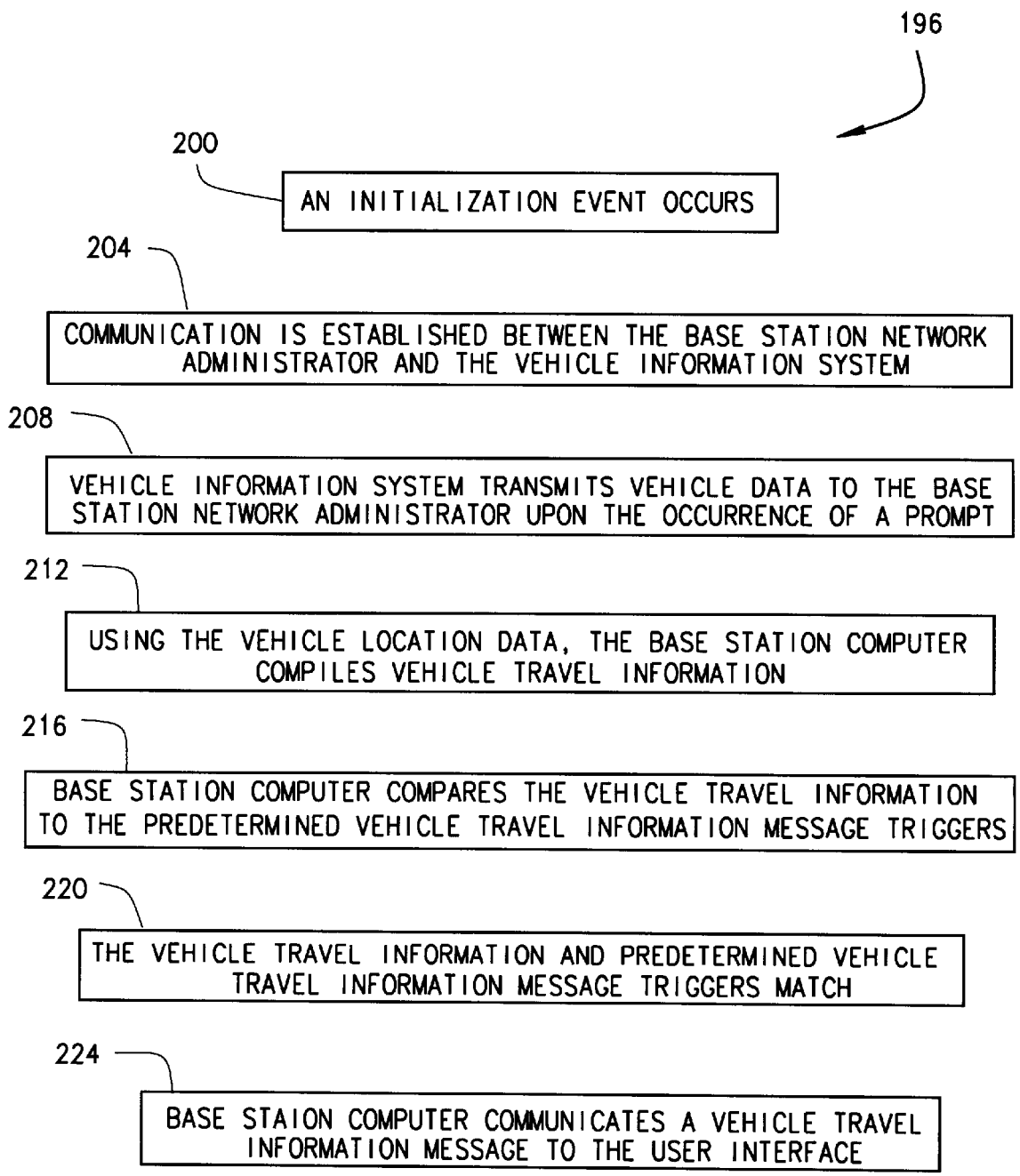
FIG. 2 is a flow chart of a messaging component of the vehicle travel information system shown in FIG. 1.

FIG. 2 shows flow chart 196 illustrating the messaging component of the vehicle tracking and messaging system shown in FIG. 1. System 10 is initialized 200 upon the occurrence of an initialization event. The initialization event includes pressing an on/off switch on VIS processor 24, engaging the ignition of the vehicle, the vehicle driver depressing a start button on driver computer interface 34, or any other event that signals the vehicle is preparing to begin travel along a route. Upon initialization, communication between BSNA 18 and VIS 14 is established 204. Once communication is established 204 between BSNA 18 and VIS 14, VIS 14 transmits 208 vehicle location data to BSNA 18 upon the occurrence of certain Prompts. Using the vehicle location data, base station computer 42 then compiles 212 vehicle travel information. Base station computer 42 then compares 216 the vehicle travel information to the user defined vehicle travel information message triggers. If base station computer 42 determines 220 there is a match a vehicle travel information message is generated and sent 224 to user communications interface 22.

Figure 3:
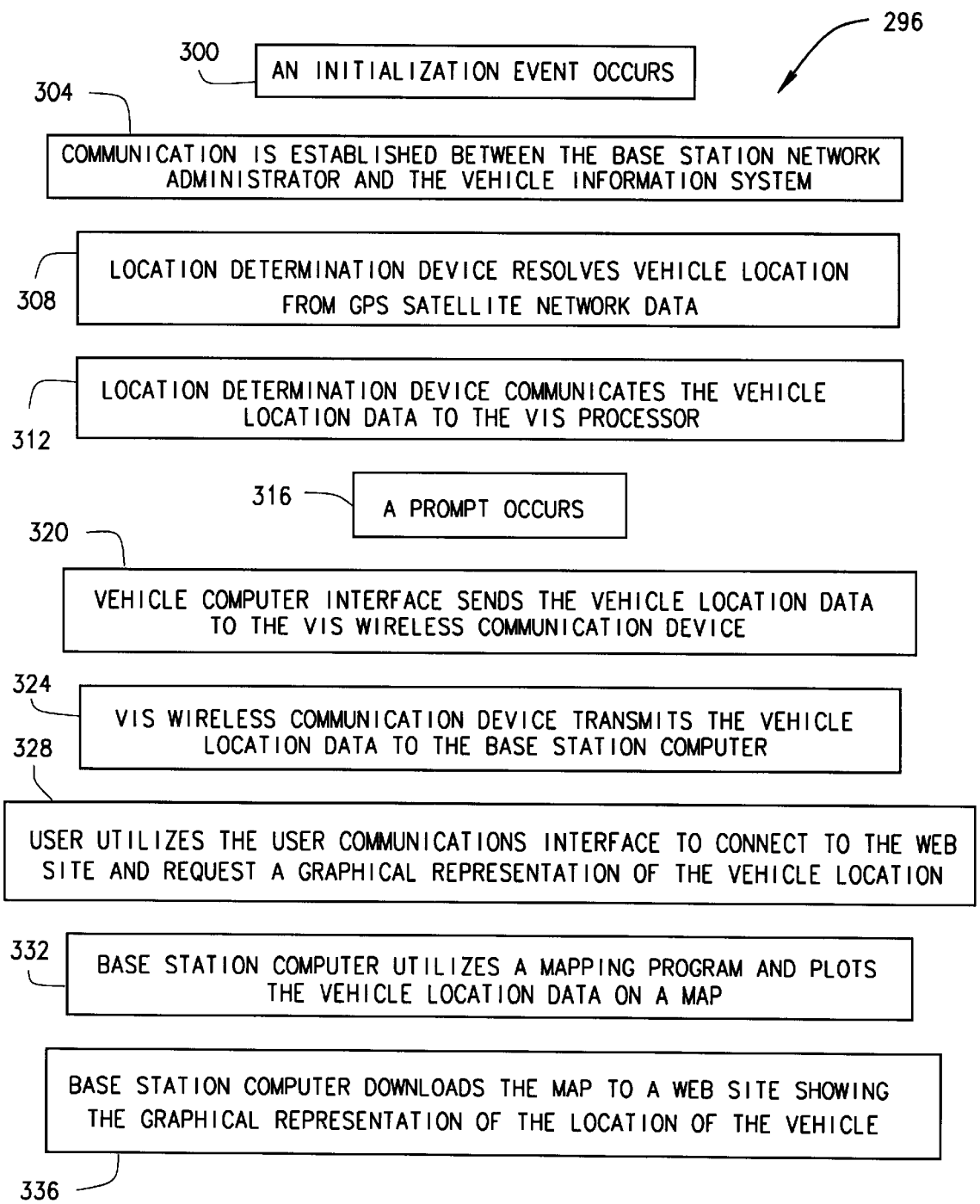
FIG. 3 is a flow chart of the vehicle tracking component of the vehicle travel information system shown in FIG. 1.

FIG. 3 shows flow chart 296 illustrating the vehicle tracking component of the vehicle tracking and messaging system shown in FIG. 1. System 10 is initialized 300 upon the occurrence of an initialization event. The initialization event includes pressing an on/off switch on VIS processor 24, engaging the ignition of the vehicle, the vehicle driver depressing a start button on the driver computer interface 34, or any other event that signals the vehicle is preparing to begin travel along a route. Upon initialization, communication between BSNA 18 and VIS 14 is established 304. In an exemplary embodiment, after communication is established 304 between BSNA 18 and VIS 14, location determination device 26 begins to resolve 308 a vehicle location from GPS satellite network 36 data. Location determination device 26 then communicates 312 the vehicle location data to VIS processor 24. This cycle of receiving location data, and sending the vehicle location data to VIS processor 24 repeats at predetermined intervals.

Upon the occurrence 316 of any Prompt, discussed herein above, VIS processor 24 sends 320 the vehicle location data to VIS wireless communication device 30 which transmits 324 the vehicle location data to base station computer 42. The user then utilizes user communications interface 22 capable of displaying graphical representations to connect 328 with the web site and requests a graphical representation of the vehicle location. Base station computer 42 utilizes a mapping program and plots 332 the vehicle location data on the map. Once the vehicle location data are plotted on the map base station computer 42 downloads 336 the map to a web site showing the graphical representation of the location of the vehicle.

Figure 4:
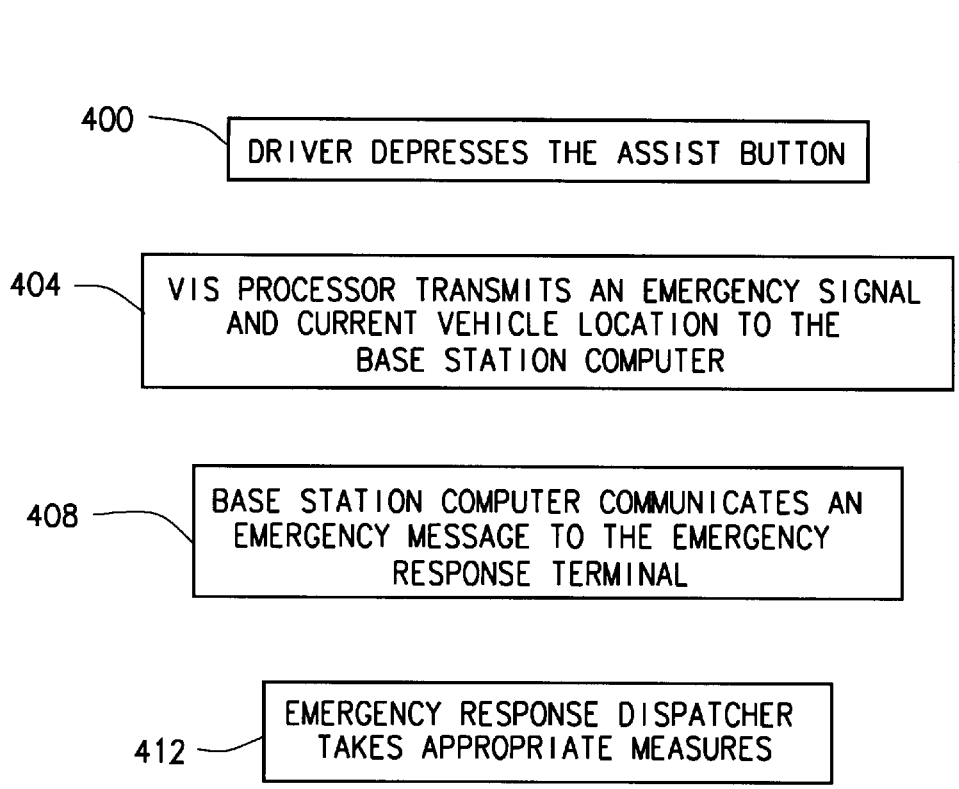
FIG. 4 is a flow chart of the emergency messaging component of the vehicle information system shown in FIG. 1.

FIG. 4 shows a flow chart 396 illustrating the emergency messaging component of the vehicle information system shown in FIG. 1. If the vehicle becomes disabled or indefinitely delayed the vehicle driver depresses 400 Assist button 40. Upon depressing Assist button 40 VIS processor 24 transmits 404 an emergency signal and the current vehicle location to base station computer 42. Upon receiving the emergency signal, base station computer 42 communicates 412 an emergency message to an emergency response terminal 46. The emergency message notifies an emergency response dispatcher that the vehicle needs immediate assistance and gives the dispatcher the vehicle location. The emergency response dispatcher then takes 416 appropriate measures, such as dispatching an emergency assistance crew and dispatching a replacement vehicle to the vehicle location.

While the invention has been described in terms of various specific embodiments, those skilled in the art will recognize that the invention can be practiced with modification within the spirit and scope of the claims.

What is claimed is:

1. A web based system for monitoring the travel of a vehicle, said system comprising:
   a vehicle information system coupled to a vehicle, said vehicle information system comprising a passenger identification device; and
   a base station network administrator configured to communicate with said vehicle information system, and to monitor the on-board status of at least one identified passenger.

2. A web based system in accordance with claim 1 wherein said passenger identification device configured to:

receive inputs from a vehicle driver;

receive a boarding identification of a passenger as the passenger boards 1he vehicle; and receive a disembarking identification of a passenger as the passenger disembarks the vehicle.

3. A web based system in accordance with claim 1 wherein said vehicle information system configured to communicate with said base station network administrator, said vehicle information system further comprising a communications device, a location determination device, a vehicle information system processor, and a driver computer interface.

4. A web based system in accordance with claim 3 wherein said passenger identification device further configured to exchange communication with said vehicle information system processor.

5. A web based system in accordance with claim 3 wherein said location determination device configured to determine vehicle location data indicating the current location of the vehicle.

6. A web based system in accordance with claim 3 wherein said base station network administrator comprises a base station computer, a database, and a web server.

7. A web based system in accordance with claim 6 wherein said vehicle information system processor further configured to communicate with said base station computer via said communications device and a wireless service provider.

8. A web based system in accordance with claim 7 wherein said communication device configured to use wireless communication, said communications device fiber configured to exchange communication with the wireless service provider and said vehicle information system processor, said base station computer configured to exchange communication with the wireless service provider.

9. A web based system in accordance with claim 7 wherein said base station computer further configured to exchange communication with said vehicle information system processor via the wireless service provider and said communication device.

10. A web based system in accordance with claim 6 wherein said driver computer interface configured to:

receive and display inputs from a vehicle driver;

receive and display communications from said vehicle information system processor;

receive and display communications from said base station computer; and receive and display communications from said passenger identification device.

11. A web based system in accordance with claim 6 wherein said base station computer further configured to exchange communication with at least one of said database, and said web server.

12. A web based method for monitoring the travel of a vehicle using a system including a base station network administrator and a vehicle information system, the vehicle information system including a vehicle information system processor, a location determination device, a driver computer interface, a communications device, and a passenger identification device, the passenger identification device configurable to be used with either of passengers or cargo, said method comprising the steps of:

receiving vehicle location data at the vehicle information system frog at least one satellite;

communicating the vehicle location data from the vehicle information system to the base station network administrator;

utilizing the base station network administrator to monitor the vehicle location;

downloading vehicle travel information; and monitoring the on-board status of identified vehicle cargo.

13. A web based method in accordance with claim 12 wherein communicating the vehicle location data comprises the step of exchanging communications between the vehicle information system processor and the base station network administrator, the base station network administrator including a base station computer, a web server, and a database.

14. A web based method in accordance with claim 13 wherein said step of receiving vehicle location data at the vehicle information system from at least one satellite further comprising the steps of:

communicating vehicle location data from the location determination device to the vehicle information system processor; and communicating vehicle location data from the vehicle information system processor to the base station computer.

15. A web based method in accordance with claim 13 wherein said step of utilizing the base station network administrator to monitor the vehicle location further comprises the steps of:

utilizing the base station computer, a mapping program, and vehicle location data Lo plot a vehicle location on a map and track the vehicle location; and updating the vehicle location coordinates upon occurrence of prompting events.

16. A web based method in accordance with claim 12 wherein said step of monitoring the on-board status of vehicle cargo further comprising the steps of:

receiving a boarding identification, via the passenger identification device;

receiving a disembarking identification, via the passenger identification device;

communicating the boarding identification and the disembarking identification to the base station computer; and determining on-board status of vehicle cargo, using the base station computer.

* * * * *

UNITED STATES PATENT AND TRADEMARK OFFICE
CERTIFICATE OF CORRECTION

PATENT NO. : 6,502,030 B2
DATED : December 31, 2002
INVENTOR(S) : Thomas Hilleary It is certified that error appears in the above-identified patent and that said Letters Patent is hereby corrected as shown below:

Column 2,
Line 29, delete "o r" and insert therefor -- or --.
Line 37, delete "I" and insert therefor -- 10 --.
Line 50, delete "PS" and insert therefor -- GPS --.

Column 9,
Line 5, delete "1he" and insert therefor -- the --.
Line 33, delete "fiber" and insert therefor -- further --.

Column 10,
Line 9, delete "frog" and insert therefor -- from --.
Line 40, delete "Lo" and insert therefor -- to --.

Signed and Sealed this

Seventeenth Day of February, 2004

JON W. DUDAS
*Acting Director of the United States Patent and Trademark Office*